Inventor
Henrich C. J. Focke
By Toulmin & Toulmin
Attys.

United States Patent Office 2,714,495
Patented Aug. 2, 1955

2,714,495

AIRCRAFT WITH ROTARY DEFORMABLE-SECTION SUSTAINING WING

Henrich Carl Johann Focke, Amsterdam, Netherlands, assignor to Ministerio da Aeronautica, Diretoria do Material, Rio de Janeiro, Brazil Application May 20, 1952, Serial No. 288,832

Claims priority, application Netherlands May 23, 1951

7 Claims. (Cl. 244—10)

The present invention relates to an improved flying machine of the type in which the slipstream has a horizontal component and the wings or sustentation planes lie in such slipstream so that owing to the effect of the slipstream on said wings the lift force is increased or produced. The type of flying machine thus defined therefore includes a helicopter of the type having steep, but not entirely vertically arranged propeller axes, which is capable of taking off vertically and hovering in the air or flying horizontally.

The object of the invention is to provide means for obtaining a further increase of the lift force, in which connection it is proposed according to the invention, to make the wings as a whole or partially rotatable about an axis transverse to the longitudinal direction of the machine, and to design such wings as a body which, upon rotation about said axis, causes a greater circulation than when it is stationary, i. e. for example as a Magnus cylinder, while also a body with a normal aerofoil, i. e. a streamline profile, gives a great lift component upon rotation about the said axis.

When the aerofoil body has the shape of a rotating cylinder, this has the advantage of producing a very high lift, but this is offset by the drawback that the drag will be great when the machine is in rapid forward flight. An aerofoil body having a streamline profile—which body, when at rest, causes reduced drag—does autorotate during the take-off of the machine at a small angle with the horizontal, but it consumes a great deal of driving power with the lift forces required for steep take-off.

In connection with the above it is proposed, according to a further characteristic feature of the invention, to give the wings the shape of a body having a normal streamline profile adapted to be transformed into a circle. It is thus possible to combine the advantages of great lift force and slight consumption of power, when the plane takes off or hovers in the air, with the advantage of slight drag when it is in rapid forward flight.

In order to realize this conception, according to the invention the aerofoil body having a streamline profile may be provided with a covering of elastic extensible material, which fits about the profile, preferably with a slight tension. When the body rotates, i. e. when for the steep take-off of the machine a lift force in the slipstream is to be produced, the covering, if the right material is chosen, will lift itself off the profile, under the influence of the centrifugal force, and transforms itself into a cylinder, while as soon as the driving power is stopped, the covering will again cling to the profile, so that the latter will function as a normal wing, when adjusted in the position for rapid forward flight, with the advantage of only slight drag. When the centrifugal force is insufficient, the transformation of the profile may also be effected by inflating.

The material used for the covering may be an elastic fabric made in such a way that the stretching ceases when the profile has become circular. Instead of this, the stretching of the covering may also be confined to the cylindrical shape by other means, such as inner walls, for example annular discs, of flexible, but non-tensile material, radially disposed bracing wires, etc.

A particularly efficient construction of the transformable aerofoil body is that in which the fixed part having the streamline profile, is provided with a covering of flexible but inextensible material, for example thin sheet metal, which is fastened at one end to a longitudinal edge of the body of the aerofoil and at the other end to one or more cover-stretching elements adapted to slide inwardly with respect to the other longitudinal edge and transverse to the latter, against a counteracting force, such as a spring or springs.

When the body does not rotate, the said elements are pushed out under the influence of the said force, so that the covering is drawn taut and fits closely about the fixed profile, in order that the latter may function as a normal wing during rapid forward flight. On the other hand, the fact that the cover-stretching elements are adapted to slide inwardly allows of the covering upon rotation to be transformed into a cylinder, under the influence of centrifugal force and while overcoming the counter acting or return force, the extent of inwardly sliding movement of the cover-stretching elements being so chosen that their outer ends pointing tailward do not protrude from the trailing edge of the aforesaid fixed part of the respective wing when the covering of the latter has attained a substantially circular-cylindrical shape.

The invention will be hereinafter explained more in detail, with reference to the accompanying drawing.

Figure 1:
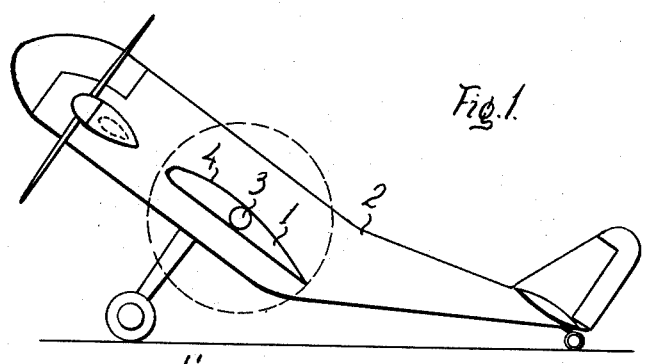
Fig. 1 is a diagrammatic illustration of a flying machine having steep, but not quite vertically arranged propeller axes and wings according to the invention.

Fig. 1 illustrates diagrammatically a flying machine the wings of which, lying in the slipstream, have the shape of a body 1 having a normal streamline profile, which can be rotated and driven about an axis 3 transverse to the longitudinal direction of the fuselage 2, and which is provided with a covering 4 of elastic, extensible material (Fig. 2) closely fitting about the profile with slight tension. This covering is fastened to both the leading and the trailing edge of the wing, and is made of extensible material of such a nature that it has enough mass to be transformed into a cylinder, when the wing rotates, under the influence of the centrifugal force, and that the stretching of the material ceases when this cylindrical shape has been attained. The dashed line designated by reference numeral 4' indicates the circumference of the expanded circular wing cover.

This covering then forms a Magnus cylinder, which produces a great lift force and as has been said, requires comparatively little driving power. However, as soon as the driving power is stopped, for rapid forward flight, the covering will collapse and cling to the wing frame again, so that a wing having a streamline profile, and consequently with a low drag suitable for rapid flight, is formed.

Figure 3:
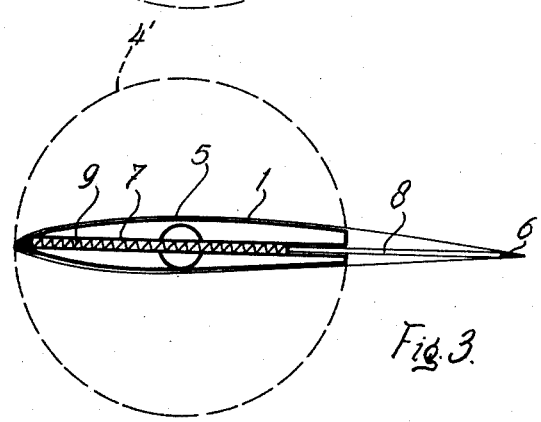
Fig. 3 is a similar illustration of a wing according to a modified embodiment.

Fig. 3 shows a modified embodiment of the transformable wing. The covering 5 of the streamline wing 1 here consists of thin, flexible but inextensible material, for example sheet metal, which is fastened at one end to the leading edge of the wing 1 and at the other end to a girder 6, which is supported by a series of cover-stretching elements consisting of rods 8 adapted to slide in guides 7. These rods are, severally or jointly, under the influence of a compression spring 9, which normally urges the rods outwardly into a position in which the covering fits about the wing 1, and the wing consequently has a normal streamline profile.

When the wing rotates about the axis 3, the covering will be transformed, under the influence of centrifugal force, into a cylinder, the rods 8 being drawn in against the action of the spring until the girder 6 abuts the back of the body 1. All this has been designed in such a way that the covering, and consequently the wing, then has a true cylindrical shape, thus acting as a Magnus cylinder in the air stream.

Figure 2:
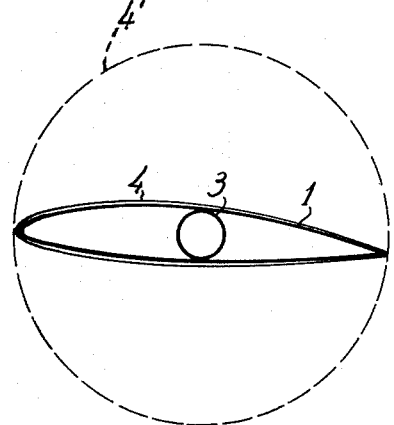
Fig. 2 is a diagrammatic cross-sectional view on a somewhat enlarged scale, of one form of wing according to the invention.

Since in this embodiment, when the wing is stopped, the depth of the profile i. e. the dimension from front to back, increases to approximately $$\frac{\pi}{2}$$

times the original depth, the axis of rotation of the wing then comes to lie at approximately 33% of the depth backwardly from the front, as a result of which the normal centre of pressure is nearer to the axis of rotation (approximately at 25% of the distance from front to back of the profile) than in the case of the covering of extensible material, where the axis of rotation always remains in the center, i. e. at 50% of the profile depth. This will be seen on a comparison of Figures 2 and 3 wherein Figure 2 shows an extensible cover while Figure 3 shows a flexible but inextensible cover.

What I claim is:

1. In a flying machine having a fuselage with propeller means thereon having a slipstream with a horizontal component and wing means lying in the slipstream; means supporting at least a portion of said wing means for rotation about an axis transverse to said fuselage, and the said portion of said wing means being deformable to assume a substantially circular-cylindrical shape when rotating and to assume a flattened shape when not rotating.

2. A flying machine according to claim 1 in which the said portion of said wing means comprises a frame and a flexible cover normally embracing said frame but extensible therefrom.

3. A flying machine according to claim 2 in which the said cover is stretchable up to the point that said portion assumes a substantially circular-cylindrical shape.

4. A flying machine according to claim 3 in which the said cover is stretchable in response to centrifugal forces developed therein by rotation of the said portion of said wing means.

5. A flying machine according to claim 1 in which the said portion of said wing means comprises a frame having a leading edge and a trailing edge, cover-extending means movably arranged along said trailing edge for movement transversely to said trailing edge, a flexible but inextensible cover closely embracing said frame and secured to the leading edge thereof and to said cover-extending means, the movement of said cover-extending means toward said leading edge of said frame permitting the extension of said cover to a substantially circular-cylindrical configuration upon rotation of said portion.

6. A flying machine according to claim 5 in which the movement of said cover-extending means toward said leading edge of said frame is limited so as to be interrupted when the said cover reaches its substantially circular-cylindrical shape.

7. A wing for an aircraft of the nature described comprising; a frame having an elongate-shaped contour, means supporting said frame for rotation about an axis extending along said frame, and flexible cover means about the frame normally closely embracing the frame but extensible therefrom to form a substantially circular cylinder about the axis on rotation of said wing.

References Cited in the file of this patent

UNITED STATES PATENTS

| | | |
|---|---|---|
| 1,714,608 | Massey | May 28, 1929 |
| 1,807,353 | Tarshis | May 26, 1931 |
| 2,039,676 | Zaparka | May 5, 1936 |